(12) United States Patent
Englert et al.

(10) Patent No.: US 11,344,859 B2
(45) Date of Patent: May 31, 2022

(54) REACTOR FOR THE PREPARATION OF A FORMULATION

(71) Applicant: SmartDyeLivery GmbH, Jena (DE)

(72) Inventors: Christoph Englert, Jena (DE); Marc Lehmann, Jena (DE)

(73) Assignee: SmartDyeLivery GmbH, Jena (DE)

( * ) Notice: Subject to any disclaimer, the term of this patent is extended or adjusted under 35 U.S.C. 154(b) by 57 days.

(21) Appl. No.: 16/697,454

(22) Filed: Nov. 27, 2019

(65) Prior Publication Data

US 2021/0154639 A1  May 27, 2021

(51) Int. Cl.
*B01J 19/18* (2006.01)
*B01J 19/00* (2006.01)

(52) U.S. Cl.
CPC ........... *B01J 19/18* (2013.01); *B01J 19/0066* (2013.01); *B01J 2219/00765* (2013.01);
(Continued)

(58) Field of Classification Search
CPC .............. B01J 19/18; B01J 19/0066; B01J 2219/1943; B01J 2219/00765; B01J 2219/00858; B01J 2219/00894
(Continued)

(56) References Cited

U.S. PATENT DOCUMENTS 2,248,632 A * 7/1941 Koller .................. C09C 1/06
106/421
5,674,531 A 10/1997 Ahlers
(Continued)

FOREIGN PATENT DOCUMENTS

CN 103528870 A * 1/2014
DE 102004003925 A1 8/2005
(Continued)

OTHER PUBLICATIONS

Syrris—"Orb Jacketed Reactor"—pp. 1-20 (Year: 2021).*
(Continued)

*Primary Examiner* — Huy Tram Nguyen
(74) *Attorney, Agent, or Firm* — McDonnell Boehnen Hulbert & Berghoff LLP

(57) ABSTRACT

The invention discloses a reactor for preparing a formulation. The reactor comprises at least two apertures, a base and at least one sidewall extending flush therefrom, wherein the base and the sidewall together define a mixing chamber with a height $h_M$ and at least one axis of symmetry arranged substantially perpendicular to the base and at least one distance r from the sidewall. A first aperture is arranged within the base or adjacent to the base in the sidewall of the mixing chamber at a height $h_A$ ranging from 0.6 to 0.0 $h_M$ in order to introduce free-flowing materials and/or mixtures to the mixing chamber. The first aperture is configured with a non-return valve disposed therein or adjacent thereto, the non-return valve permitting the introduction of free-flowing materials to the mixing chamber through the aperture, but preventing outflow of free-flowing materials from the mixing chamber through the aperture. The first aperture is formed with an aperture area extending in a range between a minimum and a maximum, the minimum area being 0.05 mm$^2$ and the maximum area being determined by a value resulting from Volume$_{mixing\ chamber}$ [cm$^3$]/Area$_{first\ aperture}$ [cm$^2$]≈5500.

19 Claims, 4 Drawing Sheets

(52) U.S. Cl.
CPC ............. *B01J 2219/00858* (2013.01); *B01J 2219/00894* (2013.01); *B01J 2219/1943* (2013.01)

(58) Field of Classification Search
USPC ........................................... 422/225
See application file for complete search history.

(56) References Cited

U.S. PATENT DOCUMENTS

| | | | |
|---|---|---|---|
| 6,458,916 B1 * | 10/2002 | Yamaguchi | B01J 8/009 422/131 |
| 6,476,256 B1 | 11/2002 | Heise | |
| 9,593,306 B2 | 3/2017 | Davis | |
| 2005/0170070 A1 | 8/2005 | Layrolle | |
| 2005/0226808 A1 | 10/2005 | Gondal | |
| 2006/0270825 A1 * | 11/2006 | Angermeier | C08G 69/04 528/310 |
| 2014/0073037 A1 * | 3/2014 | Patinier | C12N 1/12 435/267 |
| 2014/0228472 A1 * | 8/2014 | Piletsky | C08F 293/005 522/174 |

FOREIGN PATENT DOCUMENTS

| | | | | |
|---|---|---|---|---|
| DE | 102011007137 A1 | | 10/2012 | |
| WO | WO-0076657 A1 | * | 12/2000 | ............. B01J 19/20 |

OTHER PUBLICATIONS

Syrris, "Nanoparticle synthesis", URL:https://www.syrris.com/applications/nanoparticle-synthesis, Jun. 1, 2014.

Carlos et al., "Spectroanalytical methods using graphene quantum dots as photoluminescent probes for the determination of analytes of biological and pharmacological interest", Marz, URL://https://www.maxwell.vrac.puc-rio.br/35904/35904.PDF, Mar. 2, 2018.

Ameur et al., "CFD Simulations of Mixing Characteristics of Radial Impellers in Cylindrical Reactors", Chemistryselect, URL:https://chemistry-europe.onlinelibrary.wiley.com/doi/full/10.1002/slct.201600579, Jul. 1, 2017.

International Search Report for corresponding PCT application No. PCT/IB2020/061823, dated Feb. 16, 2021.

Syrris, "Orb Pilot—Chemical Scale Up as it Should be", URL:https://www.youtube.com/watch?v=xpAoJ0CFTKA&featurre=emb rel end, Apr. 3, 2017.

* cited by examiner

| Volume mixing chamber | 0,5 mL | | 2 L | |
|---|---|---|---|---|
| Batch size | 250 mL | 500 mL | 1000 mL | 1750 mL |
| Particle size (z-average) | 101 nm | 160 nm | 159 nm | 78 nm |
| Polydispersity index (PDI) < 0,2 | 0.147 | 0.107 | 0.132 | 0.060 |

Figure 4

REACTOR FOR THE PREPARATION OF A FORMULATION

FIELD OF THE INVENTION

The invention relates to a reactor for the preparation of a formulation according to the subject-matter of claim 1, to a reactor system according to the subject-matter of claim 12 and to a method for the preparation of a formulation using a reactor system according to the subject-matter of claim 15.

TECHNICAL BACKGROUND

Industrial processes requiring efficient stirring and mixing of fluids or free-flowing materials are known in a wide variety of industrial sectors. These range from the mining industry, hydrometallurgy, the oil industry, the food, pulp and paper industry to the pharmaceutical and chemical industry. In general, the term "stirring" relates to a process during which mechanical means cause the movement of a fluid in a vessel. By contrast, "mixing" relates to a process during which two or more separate phases or fluids are distributed randomly within each other. Fluids may be stirred in order to accelerate, for example, the mixing of two miscible fluids, to dissolve solids in liquids, to disperse a gas in a liquid in the form of small gas bubbles, etc. For instance, the mixing of liquids in reaction vessels or reactors may be important in order to provide for optimal operating conditions in chemical systems, where, for example, such systems require a uniform temperature or a uniform concentration of substances within the reactor.

With respect to different processes, there are no uniform requirements regarding the design of the reaction vessel, since differently shaped vessels often meet the requirements of the process. Typically, standard reactors are used to simplify design and minimize costs. When laboratory-scale experimental results are to be transferred to industrial-scale systems ("upscaling"), scale adjustment often is difficult. Starting from small-scale pilot installations, reaction vessels which are progressively larger are built and tested, ranging from pilot plants to the industrial-scale systems mentioned above. While this approach represents a way of process development that provides for relatively high transferability with respect to device dimensioning and process conditions, the associated disadvantages lie in the amount of time spent and high expenses. In the field of pharmaceutical nanotechnology, the process of upscaling the production of complex particles, such as multi-component nanostructured carrier systems, is associated with significant problems, especially when defined particle compositions and/or particle sizes are required.

The present invention advantageously provides a reactor for the preparation of formulations which may be used in discontinuous production methods ("batch processes"). In a discontinuous process, a quantity of material limited by the capacity of a production vessel (e.g. reactor, mixer) is supplied to the system in total and is removed therefrom entirely upon completion of the production process. The reactor for the preparation of formulations according to the invention, in particular the reactor for the preparation of nanotechnological formulations, advantageously offers the possibility of cost-effective and rapid upscaling compared with reactors known from the prior art. Moreover, the reactor according to the invention may be used for the production of a multitude of very different formulations.

THE INVENTION, OBJECT, SOLUTION, ADVANTAGES

In a first aspect, the invention relates to a reactor for preparing a formulation, wherein the reactor comprises at least two apertures, a base and at least one sidewall extending flush from said base. The base and sidewall together define a mixing chamber with a height $h_M$ and at least one axis of symmetry arranged substantially perpendicular to the base and at least one distance r from the sidewall, wherein a first aperture is arranged within the base or adjacent to the base in the sidewall of the mixing chamber at a height $h_A$ ranging from 0.6 to 0.0 $h_M$ in order to introduce free-flowing materials and/or mixtures to the mixing chamber. The first aperture is configured with a non-return valve disposed therein or adjacent thereto, the non-return valve permitting the introduction of free-flowing materials to the mixing chamber through the aperture, but preventing outflow of free-flowing materials from the mixing chamber through the aperture. The first aperture is formed with an aperture area extending in a range between a minimum and a maximum, with the minimum area being 0.05 mm² and the maximum area being determined by a value resulting from Volume$_{mixing\ chamber}$ [cm³]/Area$_{first\ aperture}$ [cm²]≈5500.

Technically, a formulation is defined as a mixture consisting of one or more active substances and excipients, wherein the formulation is prepared according to a formulation recipe by mixing together defined amounts of ingredients. For example, the formulation may be a drug comprising low molecular weight substances, in particular inhibitors, inducers or contrast agents, or higher molecular weight substances, in particular nucleic acids (e.g. short interfering RNA, short hairpin RNA, micro RNA, plasmid DNA) and/or proteins (e.g. antibodies, interferons, cytokines), which are potentially therapeutically useful, or the formulation may be a varnish, an emulsion paint or a synthetic material. The mixing chamber for preparing this formulation is defined by a base and a sidewall flush therewith. With respect to its shape, the base is not restricted in any particular way; for example, the base may close off the interior of the mixing chamber in the form of a planar plate, it also may exhibit a convex or concave shape (when formed as a segment of a sphere) in relation to the interior of the mixing chamber, or it may be conical. Accordingly, the at least one sidewall, ending flush with the base, may be delimited from the base or may transition smoothly into the base; the latter situation may be the case, for example, in a substantially circular mixing chamber. Preferably, the height $h_M$ of the mixing chamber is calculated based on the geometric center (centroid) of the base. The term "geometric center" refers to a defined point in a plane figure, which is the arithmetic mean position of all the points in the figure. The axis of symmetry of the mixing chamber, being arranged in at least one distance r from the sidewall, is in a vertical position with respect to a corresponding geographic coordinate system during operation. The term "non-return valve" refers to a valve preventing a backflow (backflow preventer), thereby permitting flow in only one direction of flow. A regular backflow preventer automatically closes when reversing a predetermined direction of flow and automatically opens to allow flow in the permitted direction. In its simplest design, the non-return valve may be a septum or a membrane carrying a slit, e.g. a silicone membrane or a pierceable membrane, which closes (by sealing), for example, after a puncture. In an alternative embodiment, the non-return valve may be a valve in the narrow sense, in which a closure member (e.g. a plate, a cone, a ball, or a needle) is moved approximately in parallel to the direction of flow of a fluid, wherein an interruption of the flow takes place when the sealing surface of the closure member is pressed into a suitably shaped opening, the valve seat. The first aperture, being arranged in the base or in the sidewall adjacent to the base at height $h_A$, also is not restricted regarding its shape; preferably, the first aperture is substantially circular, being formed with an area extending in a range between a minimum and a maximum, wherein the minimum is 0.05 mm². This area corresponds to the area of a cannula with an outer diameter of >30 G (i.e. outer diameter≤0.3 mm; at 0.05 mm² surface area, outer diameter=0.25 mm). The unit G (for "gauge") corresponds to the US unit classifying wires; the respective outer diameters of cannulas in millimeters are standardized also in the European standard EN ISO 6009. The higher the gauge value, the smaller the outer diameter of the cannula. Thus, the area of the first aperture is dimensioned at its minimum such that the aperture may receive a cannula having an outer diameter of 0.25 mm. As the volume of the mixing chamber increases, the area of the first aperture is adjusted accordingly, such that a maximum area is determined by a value resulting from $\text{Volume}_{mixing\ chamber}\ [\text{cm}^3]/\text{Area}_{first\ aperture}\ [\text{cm}^2] \approx 5500$. In the case of industrial-scale plants having mixing chambers with a volume of several hundred or more than thousand liters, it may be expedient to distribute the area of the first aperture over a plurality of apertures, these further apertures also being arranged in the base or adjacent to the base in the sidewall of the mixing chamber at a height $h_A$ ranging from 0.6 to 0.0 $h_M$. Advantageously, the reactor for preparing a formulation thus designed is easily scalable and enables a targeted introduction of free-flowing materials via the at least two apertures.

In a further embodiment of the reactor, the first aperture may be arranged adjacent to the base in the sidewall of the mixing chamber at a height $h_A$ ranging from of 0.4 to 0.1 $h_M$, preferably ranging from 0.25 to 0.15 $h_M$.

In a preferred implementation of the reactor according to the invention, the sidewall may be cylindrical. A reactor designed in this way typically corresponds to reactors used in many industrial processes ("standard reactor"). Advantageously, this type of reactor is characterized by a simple design, allowing minimization of costs. Furthermore, standard software applications may be used for the calculation of mixing operations of low viscosity fluids without requiring an adjustment of the respective geometrical parameters.

In a preferred embodiment a supply conduit may be arranged around the first aperture on the side of the sidewall facing away from the mixing chamber, wherein the supply conduit is designed as a receiving connector with a terminal thread for receiving the non-return valve. In a particularly advantageous embodiment, the supply conduit may be designed as a threaded closure having an internal thread. With respect to its base surface, the supply conduit may be adapted to the aperture area of the first aperture. Due to this kind of alignment, only a small volume of dead space is generated within the vicinity of the aperture area of the first aperture. The dimensioning of the supply conduit designed for receiving the non-return valve depends on the type of non-return valve (for example, a screw-on lid with a pierceable membrane/septum). When used in industrial scale applications, it is advantageous to secure the non-return valve against inadvertent disengagement from the respective aperture. A supply conduit formed with an internal thread may be designed, for example, as a conventional Luer system. A conventional Luer system is a standardized connection system in the field of medicine allowing the easy connection of syringes and infusion sets. For example, a regular cannula may be screwed via its edge onto the receiving connector having a Luer female thread, thereby locking it to the supply conduit and thus securing it against inadvertent disengagement.

In a further implementation, the first aperture and the supply conduit may be dimensioned with respect to the mixing chamber such as to prevent remixing of the free-flowing material from the mixing chamber into the supply conduit. This is achieved, in particular, if the supply conduit has the smallest possible volume and its base area is adapted to a large extent to the aperture area of the first aperture. In this arrangement, the volume of dead space (clearance volume) generated is advantageously small, thereby increasing the efficiency of the mixing process (i.e., there is only a small fraction with little or no mixing). Additionally, a small volume of dead space is advantageous with respect to an efficient use of material.

In a further embodiment of the reactor according to the invention, the second aperture may be arranged as a closable conduit for the introduction of free-flowing materials and/or mixtures of materials into the mixing chamber of the reactor and their discharge therefrom. In a particularly preferred embodiment, the second aperture may be arranged as a conduit positioned in the base of the mixing chamber substantially along its at least one axis of symmetry. During regular operation of the reactor, such a conduit positioned in the base allows for the easy discharge of free-flowing materials and/or mixtures of materials from the mixing chamber due to gravity. Such a conduit may also be utilized for introducing free-flowing materials and/or mixtures of free-flowing materials; therefor, manufacturing of the reactor is simplified advantageously by limiting the number of apertures to be incorporated as well as inlets and outlets to be potentially attached thereto.

In a preferred implementation of the reactor, an additional aperture of the reactor may be arranged opposite of the base. This embodiment is particularly advantageous when the second aperture is formed in the base as a conduit for discharging free-flowing materials and/or mixtures, and when free-flowing materials and/or mixtures are introduced via the additional opposite aperture.

In a further embodiment, the mixing chamber may be provided with at least one baffle arranged along the sidewall. A "baffle" refers to a plate, which during mixing by stirring causes an interruption of a fluid flow along the sidewalls of the mixing chamber. Especially at low stirring speeds and without a suitable baffle, free-flowing materials are merely moved without actually mixing them. A cylindrical "standard reactor", as used in industrial processes and in many computational fluid dynamics modeling techniques, is typically provided with four baffles spaced apart by 90°.

In a further implementation of the reactor according to the invention, the formulation to be prepared may be selected from the group comprising nanostructured carrier system, polyplex, nanoparticle, liposome, micelle, microparticle. A "nanostructured carrier system" refers to a nanoscale structure that is smaller than 1 μm and may be composed of several molecules. Formulations in the μm range, for example microparticles, may also be prepared advantageously in the reactor according to the invention. If the nanostructured carrier system comprises polymers, it may also be referred to as "nanoparticles", if it comprises lipids, as a "liposome" (a "micelle" is characterized by a single layer of lipids in contrast to a liposome). The nanostructured carrier system of the invention comprises polymers and lipids and serves to transport ("carry") active ingredients and/or other molecules, such as antibodies or dyes. A polyplex is defined as a nanoparticulate carrier system substantially consisting of a cationic polymer (e.g., polyethylenimine, PEI) and negatively charged genetic material, e.g. DNA or RNA, wherein the positive charges of the cationic polymer (e.g., protonated amino groups) interact with the phosphate groups of the genetic material during assembly of the particle, thus protecting the genetic material. Particulate formulations having a particle size ranging from nm to µm may be prepared with the reactor according to the invention. Irrespective of the size of the reactor or the mixing chamber of the reactor and within a predetermined size range, particles of a defined size may be prepared reproducibly by utilizing the reactor according to the invention, wherein the particles exhibit only a small variance (approx. +/−5 nm).

In a second aspect, the present invention relates to a reactor system for preparing a formulation comprising a reactor as described above and an stirring tool, wherein the stirring tool is arranged in the reactor such that it generates an axis of rotation within the free-flowing material and/or mixture during operation, which axis of rotation is largely congruent with the axis of symmetry of the mixing chamber. Herein, the term "stirring tool" refers to a tool for mixing free-flowing materials or mixtures of materials. Conventional stirring tools generally comprise a shaft which is rotatable by a motor and to which impeller blades are attached in most cases, such that rotation of the shaft directly effects movement of the impeller blades. Alternatively, however, a stirring tool may also consist of a stir bar and a stirring drive, both of which are not directly connected to each other, e.g. a magnetic stirrer. In a further alternative, stirring may be accomplished utilizing an ultrasonic stirrer, wherein the ultrasonic stirrer acts on the free-flowing material and/or the mixture of materials either from the inside or from the outside of the mixing chamber. Such stirring tools are known from the prior art. During operation, an axis of rotation is generated in the free-flowing material and/or mixtures thereof by means of the stirring tool (for example, a stirred liquid rotates about an axis of rotation), wherein an axis of rotation is a straight line which defines or describes a rotational movement.

In a preferred embodiment of the reactor system, the stirring tool may be selected from the group comprising axial flow mixers, radial flow mixers, magnetic mixers, dispersers. In practice, a distinction is made between "laminar" and "turbulent" stirring and mixing systems. The stirring tool according to the invention belongs to the turbulent stirring and mixing systems, which include, for example, propellers, pitched blade turbines, disk style flat blade turbines (Rushton impellers) and curved blade turbines. Among the various types of mixers that produce a turbulent flow, a distinction is once again made between axial flow mixers and radial flow mixers. In a radial flow mixer, the free-flowing material (hereinafter: fluid) is projected radially by the impeller(s) against the sidewall, with the fluid flow splitting along the wall and approximately 50% of the fluid being circulated in one direction (to the surface), while the rest being circulated in the opposite direction (to the bottom). The velocity of the fluid is highest in the immediate vicinity of the impeller along a horizontal line passing through the center of the impeller. The group of radial flow mixers includes, for example, the Rushton turbine with straight impellers and turbines with curved impellers, as mentioned above. In an axial flow mixer, the fluid is moved in the axial direction, i.e. parallel to the impeller shaft; overall, the fluid is pumped through the impeller blades. The flow is directed towards the bottom of the reaction vessel by the impellers to be splitted there in a radial direction to ascend near the sidewalls. Axial flow mixers include, for example, marine propellers. In low-viscosity fluids, magnetic stirrers induce both, a radial and an axial movement of the fluid as a function of the vessel geometry. A magnetic stirrer according to the invention is operated such that, during operation, it effects an axis of rotation largely congruent with the axis of symmetry of the mixing chamber. A "disperser" distributes a substance (disperse phase) in another substance (continuous phase) in the process of dispersing; a disperser according to the invention is preferably a rotor-stator arrangement. The term "dispersing" is understood to refer to the mixing of at least two materials which do not dissolve (or barely dissolve) or chemically bond with one another. During operation of the rotor of the disperser, the fluid is sucked axially into the head of the disperser, deflected therein and pressed radially through slots of the rotor-stator assembly. The acceleration forces confer very strong shear and shear forces onto the material. In addition, the suspension or emulsion to be dispersed is mixed by the turbulence occurring within the gap between rotor and stator. A disperser according to the invention is operated such that, during operation, an axis of rotation is generated, which is largely congruent with the axis of symmetry of the mixing chamber.

In a further implementation of the reactor system, the system may further comprise an introduction device and/or pumping device connected to the first aperture and/or the supply conduit. The introduction device may be utilized to supply free-flowing materials to the mixing chamber and may be configured as conventional syringe. Advantageously, the supply of free-flowing materials may be precisely regulated in terms of time and amount utilizing a pumping device. Such introduction devices and/or pumping devices (also: infusion pump) are known in the prior art.

In a third aspect, the invention relates to a method for preparing a formulation, comprising the following steps: in a first step (a), a first fluid is added to a mixing chamber of a reactor system as described above. Preferably, after the addition, the first fluid completely covers the aperture area of the first aperture. Thereafter, the first fluid is stirred such as to generate a vortex. In fluid mechanics, a vortex is a rotating movement of fluid elements about a straight or curved axis of rotation. According to the invention, a vortex may be generated by a variety of available techniques. In a third step, a second fluid is supplied to the first fluid from a reservoir. In this case, a material or mixture of materials is dissolved in the second fluid, which material or mixture of materials is substantially insoluble in the first fluid, while the second fluid dissolves completely in the first fluid. The second fluid is supplied to the mixing chamber via the first aperture such that the second fluid enters the first fluid in the region of the vortex exhibiting the highest speed of the fluid elements.

According to the invention, such materials are referred to as fluid, which deform continuously under the influence of shear forces; in physics, this term encompasses gases and liquids. In the context of the invention, the first fluid is a liquid, preferably an aqueous solution; according to the invention, the second fluid is preferably a liquid in which a material or a mixture of materials is distributed homogeneously, wherein said material or said mixture of materials is substantially insoluble in the first fluid. Preferably, the method for preparing a formulation is a precipitation reaction, wherein in said precipitation reaction, the reactands are dissolved in the solvent and at least one product of the reaction is completely insoluble or only poorly soluble in this solvent and precipitates. It is particularly preferred, if the precipitation reaction is a nanoprecipitation reaction, wherein the precipitated structures are so small as to be referred to as micro- or even nanoparticulate structures. These structures may appear to the eye as turbidity, or they even may be invisible. The process is called nanoprecipitation.

The reservoir of the invention may be an introduction device (for example, a hypodermic syringe connected to a cannula), which in turn may be connected to a pumping device.

The method of the invention advantageously provides for the efficient preparation of a formulation in a discontinuous "batch" process; the process being scalable in a simple manner in accordance with the selected reactor system, thereby equally enabling small scale and also industrial scale preparations.

In a further implementation of the method, a stirring tool with stirring blades may be used in step b to generate the vortex in the first fluid.

In a further embodiment of the method, in step c, the second fluid may enter the first fluid in the region of the stirring tool where $v_{tip}$ is the highest, with: $v_{tip} \propto \pi ND$, wherein $v_{tip}$=speed at the tip of the respective impeller blade, N=agitation velocity (in RPM=rounds per minute) and D=diameter of the impeller of the stirring tool. By adding in the area of the highest shear (maximum shear occurs in the area of the highest speed, i.e. at the impeller tip) a high initial shear stress is imparted to the added materials or mixtures. For preparing nanostructured carrier systems, pre-defining the number of passages through the region of high shear stress in the vicinity of the impeller tip advantageously enables a precise setting of the respective particle size of the nanostructured carrier systems.

In a preferred implementation of the method according to the invention, the second fluid may be supplied via a pumping device. This type of delivery advantageously allows precise control of the timing and amount of fluid supplied.

In a further embodiment of the method, the formulation to be prepared may be selected from the group comprising nanostructured carrier system, polyplex, nanoparticles, liposome, micelle, microparticles.

BRIEF DESCRIPTION OF THE FIGURES

Hereinafter, by way of example and not limiting, certain particular embodiments of the invention will be described with reference to the accompanying drawings.

The particular embodiments are merely illustrative of the general inventive concept, but do not limit the invention in any way.

In FIG. 4 the characteristics of various formulations (in this case: nanostructured carrier systems) which were prepared utilizing differently sized reactors according to the invention are presented in a table.

PREFERRED EMBODIMENT OF THE INVENTION

Figure 1:
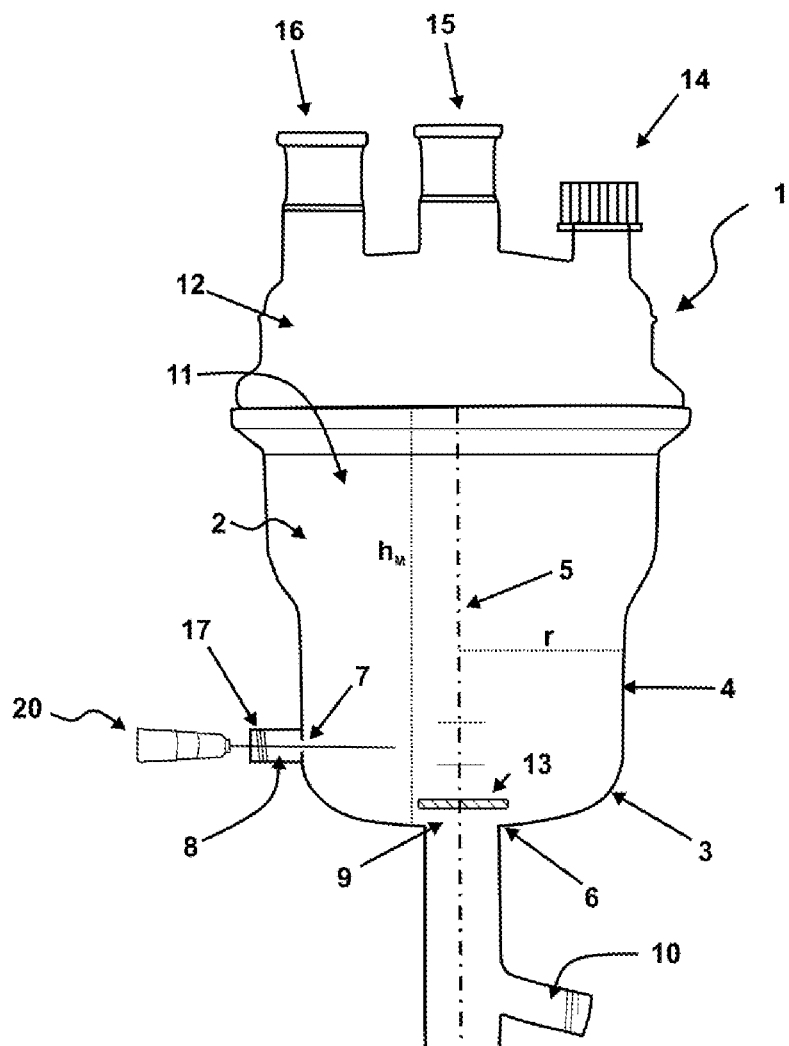
FIG. 1 depicts a schematic view of the reactor according to the invention.

FIG. 1 depicts a reactor (1) for preparing a formulation according to the present invention. The reactor (1) comprises a mixing chamber (2) which is defined by a base (3) and at least one sidewall (4) extending flush therefrom. The mixing chamber (2) is characterized by a height $h_M$ (vertical dotted line) and an axis of symmetry (5, dash-dotted line), which in the present embodiment is arranged perpendicular to the base (3) at a distance r (horizontal dotted line) of the sidewall (4). The mixing chamber (2) is arranged substantially as a cylinder (corresponding to a "standard reactor"), wherein the base (3) is configured, with respect to the interior of the mixing chamber (2), as a convex spherical segment with a centrally disposed flattened region (6). The sidewall (4) is formed with a first aperture (7) adjacent to the base (3), wherein the first aperture is located at a height $h_A$ of 0.18 $h_M$ in order to allow the introduction of free-flowing materials and/or mixtures into the mixing chamber (2). The first aperture (7) is configured with an aperture area extending in a range between a minimum and a maximum. The minimum area of the first aperture (7) is 0.05 mm$^2$, corresponding to the area of a conventional cannula having an outer diameter of 0.25 mm. As part of a scaling process, the aperture area may be adapted to the volume of the mixing chamber, with the maximum area determined by a value resulting from Volume$_{mixing\ chamber}$ [cm$^3$]/Area$_{first\ aperture}$ [cm$^2$]≈5500. The first aperture (7) is arranged with a supply conduit (8). The reactor (1) furthermore comprises a second aperture (9) arranged in the centrally disposed flattened region (6) of the base (3) along the axis of symmetry (5) of the mixing chamber (2), wherein the second aperture (9) is designed as a closable conduit. During regular operation of the reactor, free-flowing materials and/or mixtures may be discharged from the mixing chamber (2) via the conduit in accordance with gravity, the entry of free-flowing materials and/or mixtures of materials, however, may also be effected via the conduit. In the present case, the conduit extending from the second aperture (9) is formed with a branch (10), allowing for separate removal of reaction products. Opposite the base (3) the reactor (1) is formed with a third aperture (11), which in the present embodiment is sealed by a lid (12). Via this third aperture (11), further free-flowing materials and/or mixtures of materials and/or tools such as a stirring tool (13) may be introduced into the mixing chamber (2). Conventional mixers selected from the group of axial flow mixers, radial flow mixers, and dispersers may be considered for performing the mixing operation, alternatively, however, mixing may also be accomplished by utilizing a magnetic stirrer (13, shown here) or other stirrers operateable without an agitator shaft. In the case of a magnetic stirrer, for example, no agitator shaft is required since a rotating magnetic field outside of the mixing chamber drives the stir bar located within the mixing chamber. The lid (12) arranged above the third aperture (11) enables the preparation of a formulation under defined ambient conditions, wherein measuring devices, such as a thermometer or a pH meter, may be introduced into the mixing chamber (2) via additional apertures (14, 15, 16).

Figure 2:
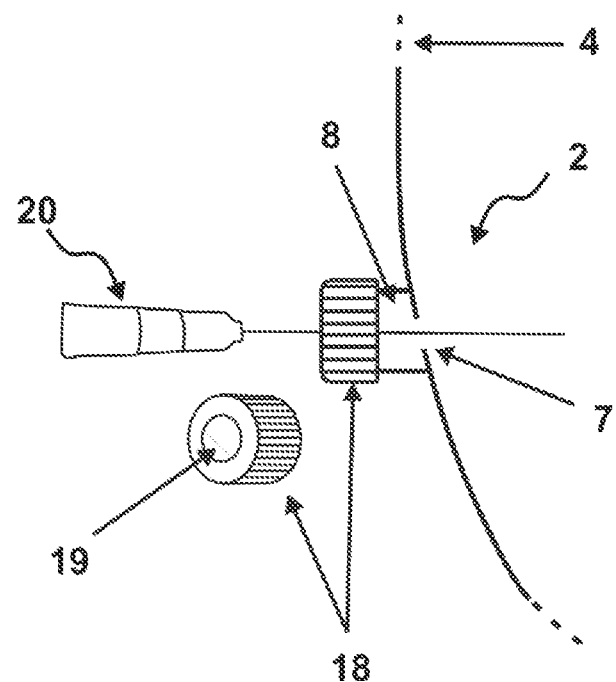
In FIG. 2, a detailed view of the reactor according to the invention in the region of the first aperture is shown.

The detailed view shown in FIG. 2 is limited to the region of the first aperture (7) of the reactor as depicted in FIG. 1, which is formed with a supply conduit (8) arranged in the region adjacent to the aperture. The first aperture (7) is configured with a diameter which e.g. corresponds to the diameter of a cannula, for example, 11 G (3.0 mm). The supply conduit (8) arranged around the first aperture (7) is dimensioned with respect to the mixing chamber (2) such as to prevent re-mixing of the liquid from the mixing chamber (2) into the supply conduit (8). By this arrangement, the volume of dead space (clearance volume) is kept as low as possible, thereby increasing the efficiency of the mixing process. Also, the amount of material required for the mixing process, which is supplied through the first aperture, is kept as low as possible, thus enabling cost efficiency in the preparation of the formulation. The supply conduit (8) is formed with a terminal external thread (not shown in FIG. 2). Utilizing the external thread, the non-return valve according to the invention may close off sealingly the first aperture (7) and thus the mixing chamber (2) with respect to the environment. In the embodiment shown, the non-return valve is designed as a screw cap (18) which can be screwed to the external thread (17) of the supply conduit (8) via its corresponding internal thread. The non-return valve further comprises a pierceable membrane (19), which preferably consists of an elastic material (e.g. bromobutyl rubber), such that self-sealing is ensured after a puncture with a needle.

Figure 3:
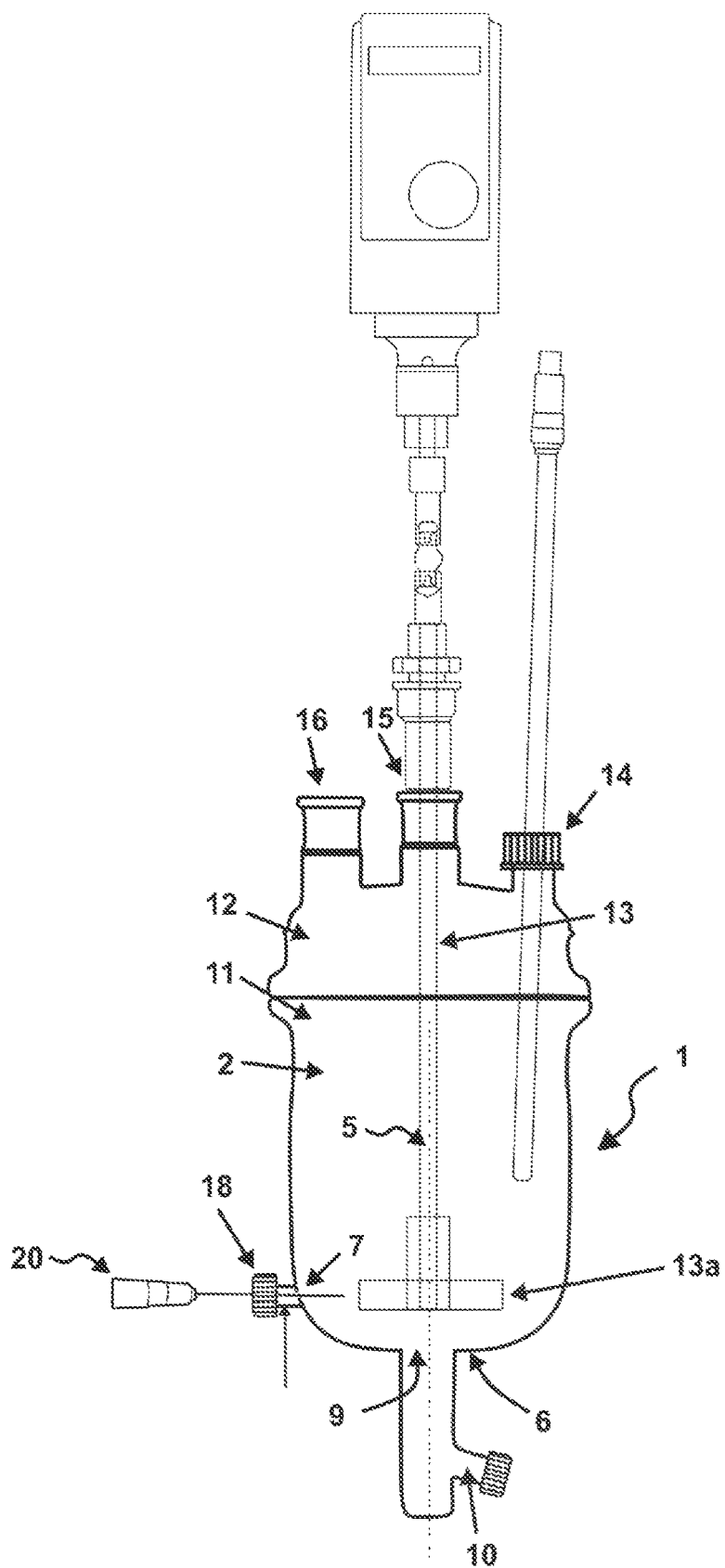
FIG. 3 illustrates an alternative embodiment of the reactor with an inserted stirring tool.

In FIG. 3 an alternative embodiment of the reactor is shown wherein a stirring tool is inserted into the mixing chamber. The stirring tool (13) as illustrated is a rod mixer introduced via opening 15, having an agitator shaft (13a) advantageously arranged along the axis of symmetry (5) of the reactor's (1) mixing chamber (2). The operating end of the agitator shaft (13a) is arranged with stirring blades (13b); herein, the mixer may be a radial flow mixer or an axial flow mixer. A second fluid (not shown) is added to the first fluid (not shown) present in the mixing chamber (2) via the first aperture (7) by means of an introduction device (20) used for puncturing a pierceable membrane (not shown) located in a screw cap (18). The introduction is effected in the region the stirring blades (13b) of the stirring tool (13). In the region of the vortex generated in the first fluid by the stirring tool (13), the velocity of the fluid elements is highest. Additional measuring instruments or probes (for example temperature/pH probes) may be introduced via the additional apertures (14, 16) in the lid (12); a temperature probe introduced into the aperture (14) is shown here by way of example.

FIG. 4 depicts a table summarizing properties of various formulations (here: nanostructured carrier systems), which were prepared with differently sized reactors (500 ml, 2 l) according to the invention. The nanostructured carrier systems were examined with respect to particle size and polydispersity index (PDI). The Z-average indicates the average particle diameter based on the intensity distribution of a scattered light signal; polydispersity evaluates the width of the distribution. Statistically, the z-average is an intensity-based average based on a specific fit to raw correlation function data. The fit is also referred to as cumulative method and may be regarded as forced fitting of the result to a simple Gaussian distribution, where the z-mean is the mean and the PDI is related to the width of that simple distribution (assuming a single average). Here, particle sizes varied ranging from 78 nm to 160 nm, wherein, for example, in both the 500 ml and in the 2 l reactor, desired particle sizes of about 160 nm could be achieved. With regard to the width, all nanostructured carrier systems prepared were at a polydispersity index of <0.2, as desired. Accordingly, all formulations were characterized by excellent homogeneity of the particles, regardless of the size of the reactor utilized for preparation.

REFERENCE SIGNS 1 reactor
2 mixing chamber (height NO
3 base
4 sidewall
5 axis of symmetry
6 centrally disposed flattening of the base
7 first aperture (a height $h_A$)
8 supply conduit
9 second aperture
10 branch
11 additional aperture
12 lid
13 stirring tool
13a shaft of the stirring tool
13b stirring blade
14 lid aperture
15 lid aperture
16 lid aperture
17 external thread of the supply conduit
18 screw lid
19 pierceable membrane
20 introduction device

The invention claimed is:

1. A reactor for preparing a formulation, wherein the reactor comprises at least two apertures, a base and at least one sidewall extending flush therefrom,
   wherein the base and the at least one sidewall together define a mixing chamber with a height $h_M$ and at least one axis of symmetry arranged substantially perpendicular to the base and at least one distance r from the at least one sidewall,
   wherein a first aperture is arranged within the base or adjacent to the base in the at least one sidewall of the mixing chamber at a height $h_A$ ranging from 0.6 to 0.0 $h_M$ in order to introduce free-flowing materials and/or mixtures to the mixing chamber, and
   wherein the first aperture is configured with a non-return valve disposed therein or adjacent thereto, the non-return valve permitting the introduction of free-flowing materials to the mixing chamber through the first aperture, but preventing outflow of free-flowing materials from the mixing chamber through the first aperture,
   wherein the first aperture is formed with an aperture area extending in a range between a minimum and a maximum, the minimum area being 0.05 mm² and the maximum area being determined by a value resulting from $Volume_{mixing\ chamber}$ [cm³]/$Area_{first\ aperture}$ [cm²]≈5500, and
   wherein a second aperture is arranged as a closable conduit for the introduction of free-flowing materials and/or mixtures of materials into the mixing chamber of the reactor and/or their discharge therefrom.

2. The reactor according to claim 1, wherein the first aperture is arranged adjacent to the base in the at least one sidewall of the mixing chamber at a height $h_A$ ranging from 0.4 to 0.1 $h_M$.

3. The reactor according to claim 1, wherein the at least one sidewall is cylindrical.

4. The reactor according to claim 1, wherein a supply conduit is arranged around the first aperture on the side of the at least one sidewall facing away from the mixing chamber, wherein the supply conduit is designed as a receiving connector with a terminal thread for receiving the non-return valve.

5. The reactor according to claim 4, wherein the supply conduit is designed as a threaded closure having an internal thread.

6. The reactor according to claim 4, wherein the first aperture and the supply conduit are dimensioned with respect to the mixing chamber such as to prevent re-mixing of a liquid from the mixing chamber into the supply conduit.

7. The reactor according to claim 1, wherein the second aperture is arranged as a conduit positioned in the base of the mixing chamber substantially along its at least one axis of symmetry.

8. The reactor according to claim 1, wherein an additional aperture of the reactor is arranged opposite of the base.

9. The reactor according to claim 1, wherein the mixing chamber is provided with at least one baffle arranged on the at least one sidewall.

10. The reactor according to claim 1, wherein the formulation to be prepared is selected from the group comprising nanostructured carrier system, polyplex, nanoparticles, liposome, micelle, microparticles.

11. A reactor system for preparing a formulation comprising a reactor according to claim 1, and a stirring tool, wherein the stirring tool is arranged in the reactor such that it generates an axis of rotation within the free-flowing material and/or mixture during operation, which axis of rotation is largely congruent with the axis of symmetry of the mixing chamber.

12. The reactor system according to claim 11, wherein the stirring tool is selected from the group comprising axial flow mixer, radial flow mixer, magnetic mixer, disperser.

13. The reactor system according to claim 11, further comprising an introduction device and/or a pumping device connected to the first aperture and/or a supply conduit.

14. A method of preparing a formulation comprising the steps
   a. adding a first fluid to a mixing chamber of a reactor system according to claim 11,
   b. stirring the first fluid such as to generate a vortex,
   c. supplying a second fluid to the first fluid from a reservoir, wherein a material or mixture of materials substantially insoluble in the first fluid is dissolved in the second fluid, while the second fluid is completely soluble in the first fluid, wherein the second fluid is supplied to the mixing chamber via the first aperture such that the second fluid enters the first fluid in the region of the vortex exhibiting the highest speed of the fluid elements.

15. The method according to claim 14, wherein in step b, a stirring tool is used with stirring blades for generating the vortex in the first fluid.

16. The method according to claim 15, wherein in step c, the second fluid enters the first fluid in the region of the stirring tool where $v_{tip}$ is the highest, with: $v_{tip} \propto \pi ND$, wherein $v_{tip}$=speed at a tip of the respective impeller blade, N=agitation velocity, D=diameter of the impeller of the stirring tool.

17. The method according to claim 14, wherein the second fluid is supplied via a pumping device.

18. The method according to claim 14, wherein the formulation to be prepared is selected from the group comprising nanostructured carrier system, polyplex, nanoparticles, liposome, micelle, microparticle.

19. The reactor according to claim 1, wherein the first aperture is arranged adjacent to the base in the at least one sidewall of the mixing chamber at a height $h_A$ ranging from 0.25 to 0.15 $h_M$.

* * * * *